(12) United States Patent
Sheehan

(10) Patent No.: US 9,130,906 B1
(45) Date of Patent: Sep. 8, 2015

(54) METHOD AND APPARATUS FOR AUTOMATED SECURE ONE-WAY DATA TRANSMISSION

(71) Applicant: The United States of America as represented by the Secretary of the Navy, Washington, DC (US)

(72) Inventor: Matthew M. Sheehan, Venture, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/285,880

(22) Filed: May 23, 2014

(51) Int. Cl.
*H04L 27/28* (2006.01)
*H04L 29/06* (2006.01)
*H04W 12/08* (2009.01)

(52) U.S. Cl.
CPC .............. *H04L 63/029* (2013.01); *H04L 63/12* (2013.01); *H04W 12/08* (2013.01)

(58) Field of Classification Search
CPC ..... H04W 12/00; H04W 12/12; H04W 40/24; H04L 63/1408; H04L 63/1441
USPC ................. 375/130, 260, 295, 299, 316, 340; 709/229; 713/176; 726/22
See application file for complete search history.

(56) References Cited

U.S. PATENT DOCUMENTS

| | | |
|---|---|---|
| 5,359,446 A | 10/1994 | Johnson |
| 5,410,147 A | 4/1995 | Riza |
| 5,499,024 A | 3/1996 | Germanton |
| 5,561,732 A | 10/1996 | Gergely |
| 5,574,589 A | 11/1996 | Feuer |
| 6,363,365 B1 * | 3/2002 | Kou ................................. 705/64 |
| 6,791,276 B2 | 9/2004 | Li |
| 6,889,325 B1 * | 5/2005 | Sipman et al. ................ 713/176 |
| 6,912,360 B1 | 6/2005 | Sparrold |
| 6,934,438 B2 | 8/2005 | Hoke |
| 7,542,673 B2 | 6/2009 | Chung |
| 7,565,082 B2 | 7/2009 | Yazaki |
| 7,675,867 B1 | 3/2010 | Mraz |
| 7,941,526 B1 | 5/2011 | Hope |
| 8,068,415 B2 | 11/2011 | Mraz |
| 8,248,467 B1 | 8/2012 | Ganick |
| 8,547,036 B2 | 10/2013 | Tran |

(Continued)

FOREIGN PATENT DOCUMENTS

| | | |
|---|---|---|
| EP | 0889430 A2 | 12/2012 |
| EP | 2134055 B1 | 12/2012 |

(Continued)

OTHER PUBLICATIONS

Kedar-2004; Urban optical wireless communication networks: the main challenges and possible solutions; Kedar, D.; Aron, S.

*Primary Examiner* — Khanh C Tran
(74) *Attorney, Agent, or Firm* — Christopher A. Monsey

(57) ABSTRACT

The present disclosure relates to a method and system for one-way data transmission from an open network to a closed network. A data transmission controller on an open network provides a data stream to first, second, and third transmitter nodes on the open network. The first and second transmitter nodes transmit the data stream to corresponding receiver nodes on a closed network. The third transmitter node transmits the data stream to a receiver node on the open network. Data transmission verification is performed at both the open network and the closed network.

27 Claims, 14 Drawing Sheets

(56) References Cited

U.S. PATENT DOCUMENTS

| | | |
|---|---|---|
| 2004/0088551 A1* | 5/2004 | Dor et al. ............ 713/182 |
| 2005/0038718 A1* | 2/2005 | Barnes et al. .......... 705/28 |
| 2005/0135612 A1 | 6/2005 | Evans |
| 2008/0244676 A1* | 10/2008 | DaCosta ............ 725/116 |
| 2011/0044701 A1 | 2/2011 | Schenk |
| 2011/0047627 A1* | 2/2011 | Sheymov ............ 726/26 |
| 2011/0252116 A1 | 10/2011 | Menoher |
| 2012/0017079 A1 | 1/2012 | Mraz |
| 2012/0030768 A1 | 2/2012 | Mraz |
| 2012/0042357 A1 | 2/2012 | Mraz |
| 2012/0151075 A1 | 6/2012 | Mraz |
| 2012/0162697 A1 | 6/2012 | Mraz |
| 2012/0278884 A1 | 11/2012 | Menoher |
| 2012/0331097 A1 | 12/2012 | Menoher |
| 2013/0097283 A1 | 4/2013 | Menoher |
| 2013/0152206 A1 | 6/2013 | Staubly |
| 2013/0208132 A1 | 8/2013 | Ryan |
| 2013/0254878 A1 | 9/2013 | Clarke |
| 2014/0132984 A1* | 5/2014 | Oshima ............ 358/1.15 |

FOREIGN PATENT DOCUMENTS

| | | |
|---|---|---|
| WO | WO91/09477 | 6/1991 |
| WO | WO03/036834 | 5/2003 |
| WO | WO2013/016439 | 1/2013 |
| WO | WO2013/116208 | 8/2013 |
| WO | WO2013/126585 | 8/2013 |

* cited by examiner

METHOD AND APPARATUS FOR AUTOMATED SECURE ONE-WAY DATA TRANSMISSION

STATEMENT REGARDING FEDERALLY SPONSORED RESEARCH OR DEVELOPMENT

The invention described herein includes contributions by one or more employees of the Department of the Navy made in performance of official duties and may be manufactured, used, licensed by or for the United States Government without payment of any royalties therein.

FIELD OF THE DISCLOSURE

The present disclosure relates generally to network security, and more particularly to methods and apparatuses for secured one-way transmission of data from an open network to a closed network.

BACKGROUND OF THE DISCLOSURE

Computer networks implement varying levels of security to protect the network from unauthorized data access or interception. An open network has limited or reduced security measures, while a closed network implements strict security measures and limits access to privileged users.

For example, an open network may allow users access to internet connectivity and other applications such as e-mail, web services, and external file transfer. A closed network may block or restrict internet connectivity, e-mail, web services, and other communications external to the closed network. The closed network may store sensitive information that is not generally available to the general public, such as financial records, personnel records, trade secrets, and other industry or company secrets, for example. Closed networks may be used by government agencies, intelligence communities, financial institutions, and commercial applications, for example.

Databases updated on an open network may require similar updates on the closed network. Synchronization of data on the open and closed networks provides data consistency for purposes of storage, usage, comparison, and/or analysis. Such data may be stored in servers, personal computers, phones, networking hardware (modems, hubs, switches, nodes), mobile devices, machinery, vehicles, etc. Transferring data from an open network to a closed network may introduce risk at the closed network of exposure to malicious code or content from the transmitting open network. Further, the risk of service attacks and system and/or data corruption is increased when the closed network receives data from an open network. Bi-directional communication between the closed network and open network may increase the likelihood of sensitive data leaking from the closed network to the open network.

Open and closed networks are often physically isolated, thereby limiting the ability to transfer data between the networks. To sync data in open and closed networks in some conventional systems, data from the open network is copied to a portable physical storage device, such as a CD, DVD, or thumb drive, and manually transferred from the storage device to a database or other device on the closed network. The use of portable storage devices for such data transfer is both inefficient and time-consuming, particularly in systems where the databases on the open network are updated frequently.

SUMMARY OF EMBODIMENTS OF THE DISCLOSURE

In an exemplary embodiment of the present disclosure, a method for one way data transmission from an open network to a closed network is provided. The method includes providing, by at least one control device on the open network, a data stream to a first dedicated transmitter node and a second dedicated transmitter node. The first and second dedicated transmitter nodes are each on the open network. The method includes transmitting, by the first dedicated transmitter node, the data stream over a first one-way communication path from the open network to a first dedicated receiver node of a closed network. The method further includes transmitting, by the second dedicated transmitter node, the data stream over a second one-way communication path from the open network to a second dedicated receiver node of the closed network.

In another exemplary embodiment of the present disclosure, a data transmitter device on an open network is provided for one way data transmission from the open network to a closed network. The data transmitter device includes a database and at least one control device coupled to the open network and to the database. The at least one control device is operative to provide a data stream based on data in the database. The data transmitter device further includes a plurality of dedicated transmitter nodes in communication with the at least one control device and each operative to transmit the data stream. The plurality of dedicated transmitter nodes includes a first dedicated transmitter node and a second dedicated transmitter node. The first dedicated transmitter node is operative to transmit the data stream over a first one-way communication path to a first dedicated receiver node of a receiver device on the closed network. The second dedicated transmitter node is operative to transmit the data stream over a second one-way communication path to a second dedicated receiver node of the receiver device on the closed network.

In yet another exemplary embodiment of the present disclosure, a data receiver device on a closed network is provided for one way data transmission from an open network to the closed network. The data receiver device includes a database, a first receiver node on the closed network operative to receive a first data stream from a first transmitter node on the open network over a first one-way communication path, and a second receiver node on the closed network operative to receive a second data stream from a second transmitter node on the open network over a second one-way communication path. The data receiver device further includes at least one control device on the closed network operative to perform a data transmission verification based on a comparison of the first data stream received by the first receiver node to the second data stream received by the second receiver node.

In still another exemplary embodiment of the present disclosure, a one-way data transmission system is provided including a data transmitter device coupled to an open network and a data receiver device coupled to a closed network. The data transmitter device includes at least one control device operative to provide a data stream. The data transmitter device further includes a plurality of transmitter nodes including a first transmitter node and a second transmitter node. The first transmitter node is operative to transmit the data stream over a first one-way communication path to a closed network, and the second transmitter node is operative to transmit the data stream over a second one-way communication path to the closed network. The data receiver device includes a first receiver node operative to receive the data stream from the first transmitter node over the first communication path, a second receiver node operative to receive the data stream from the second transmitter node over the second communication path, and at least one control device operative to perform a data transmission verification based on a comparison of the data stream received by the first receiver node and the data stream received by the second receiver node.

BRIEF DESCRIPTION OF THE DRAWINGS

The embodiments will be more readily understood in view of the following description when accompanied by the below figures and wherein like reference numerals represent like elements.

DETAILED DESCRIPTION

Figure 1:
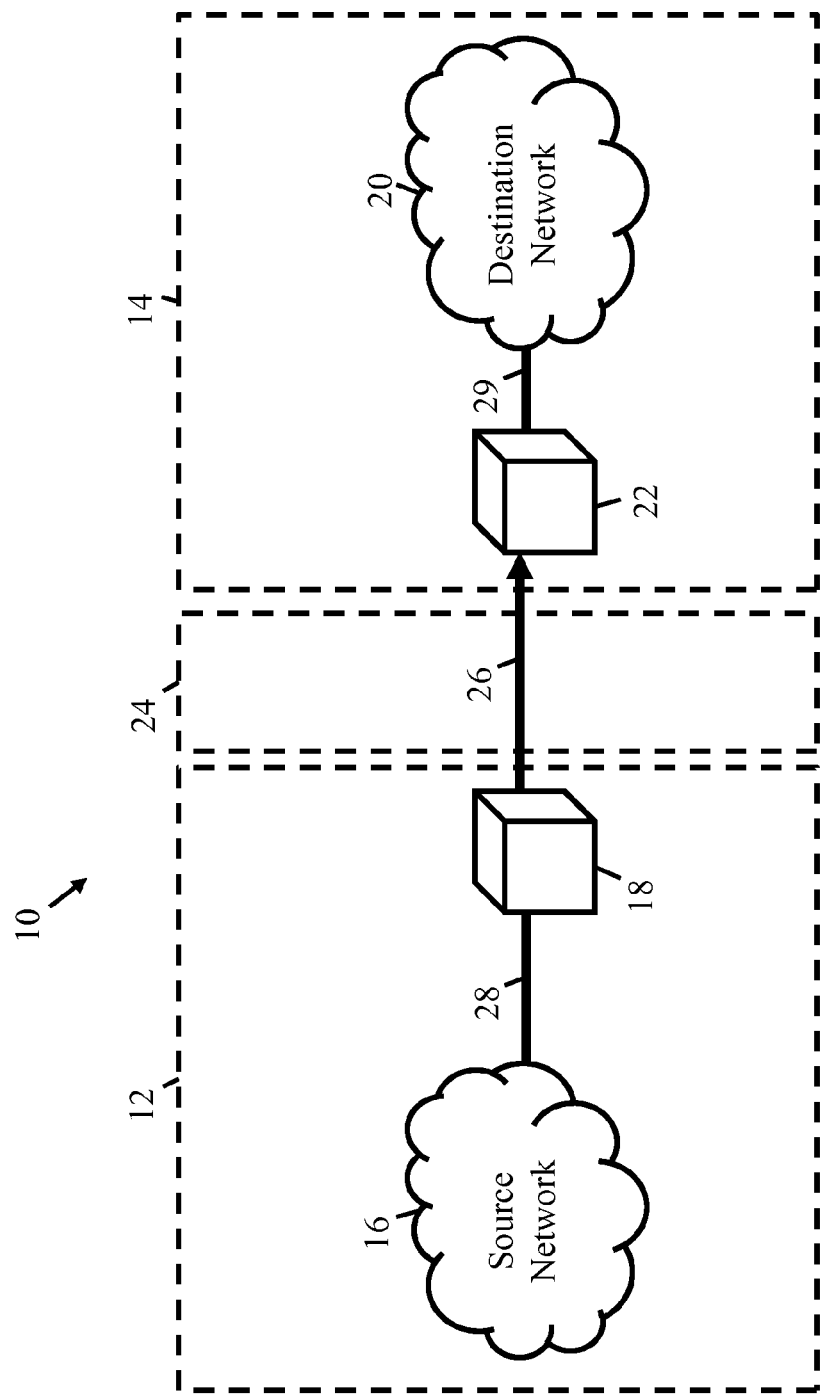
FIG. 1 illustrates a one-way data transmission system according to some embodiments for transmitting data from an open network to a closed network.

Referring initially to FIG. 1, a one-way data transmission system 10 is illustrated for transmitting data from an open computer network 12 to a closed computer network 14. Open network 12 includes a data transmitter device 18 coupled to a source network 16 via communication link 28. Source network 16 includes one or more computer databases and/or other electronic devices. Electronic devices may include a computer, server, phone, database, networking hardware, sensors, electronic devices on machinery or vehicles, personal devices, mobile devices, and electronic devices configured for radio frequency identification, near field communication, internet service providers, etc. Data transmitter device 18 retrieves data from the databases of source network 16 and transmits the data to closed network 14 over one or more communication paths 26. Closed network 14 includes a data receiver device 22 coupled to a destination network 20 via communication link 29. Destination network 20 includes one or more computer databases and stores data received by data receiver device 22. Data transmitter device 18 and data receiver device 22 cooperate to synchronize databases on closed network 14 with updated databases on open network 12. Communication links 28 and 29 may include any suitable wired or wireless communication link.

An air gap or free space 24 provides a security barrier between data transmitter device 18 and data receiver device 22 to isolate open network 12 from closed network 14. Air gap 24 may be any suitable distance, ranging from short distances (e.g., less than several feet) to long distances (e.g., several meters to several miles), depending on the transmission capabilities of data transmitter device 18. In the illustrated embodiment, one-way data transmission system 10 does not include a feedback loop from closed network 14 to open network 12, as described herein.

Closed network 14 implements increased security measures as compared to the reduced or minimal security in open network 12. The security measures of closed network 14 may include security technologies that restrict or block communication with devices and services external to closed network 14, such as internet services, web services, external data transfer, external email services, etc. Such security technologies may serve to reduce the likelihood of security threats such as, for example, viruses, worms, denial of service, eavesdropping, exploits, malware, rootkits, keyloggers, unauthorized user access or modification, cybercrime, cyber warfare/ information warfare, unauthorized execution of code/ applications/services/system shutdown and reboot, active and passive network attacks, and other security threats. Open network 12, on the other hand, allows access by computer devices on network 12 to one or more external devices and services such as the internet services, web services, external data transfer, external email services, etc. In the illustrated embodiment, open network 12 implements fewer security measures than closed network 14. In one embodiment, closed network 14 is a classified network, and open network 12 is an unclassified network. Other types of open and closed networks may be provided.

Figure 2:
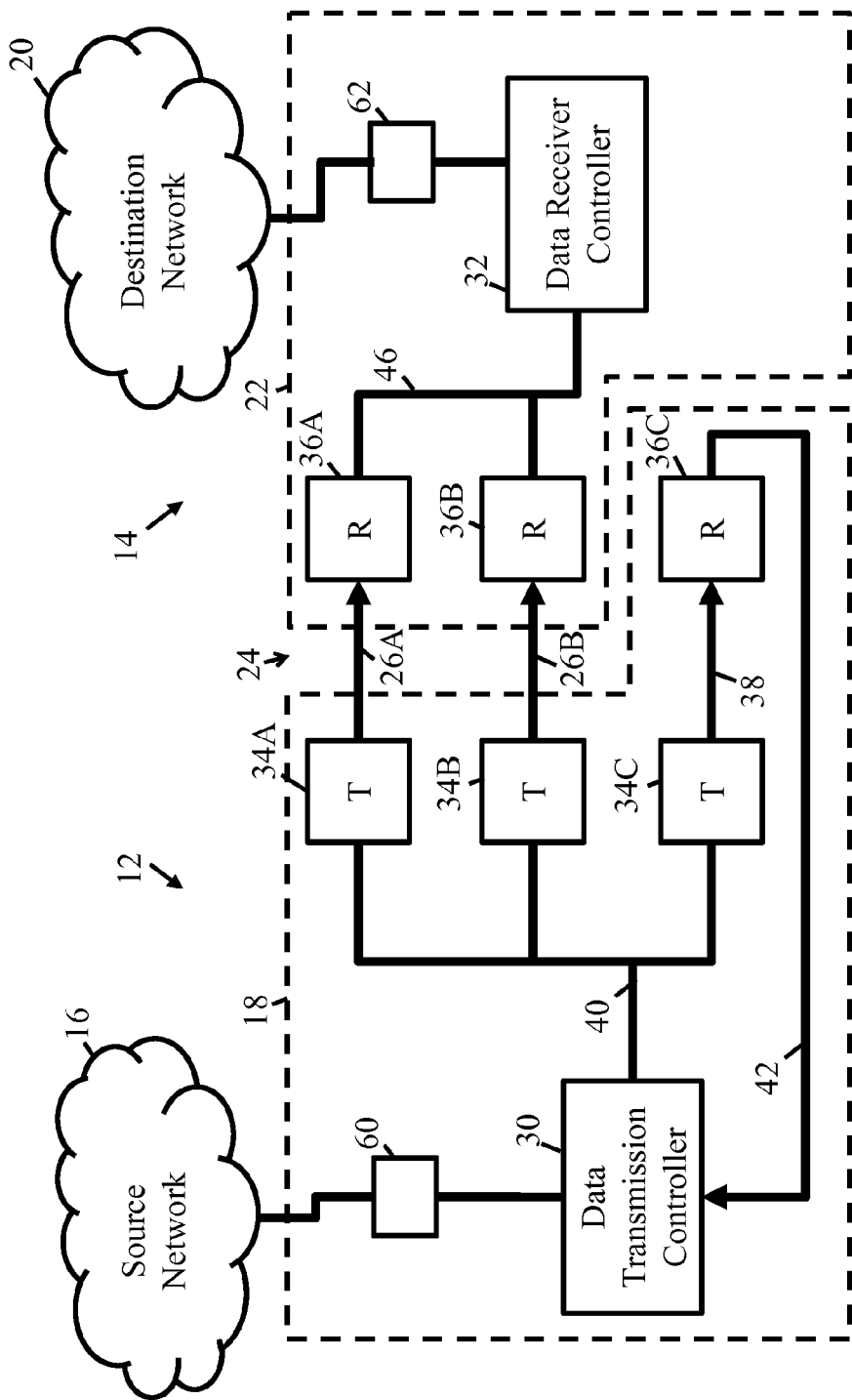
FIG. 2 illustrates a data transmitter device on the open network and a data receiver device on the closed network of the one-way data transmission system of FIG. 1.

Referring to FIG. 2, data transmitter device 18 includes a data transmission controller 30 in communication with a network interface controller 60. Data transmission controller 30 includes one or more control devices for controlling and managing data retrieval from source network 16 and the transmission of data to closed network 14. Network interface controller 60 includes computer hardware and/or logic that manages communication between controller 30 and source network 16. Similarly, data receiver device 22 includes a data receiver controller 32 in communication with a network interface controller 62. Data receiver controller 32 includes one or more control devices for controlling and managing the reception of data from open network 12 and the synchronization of the received data with destination network 20. Network interface controller 62 includes computer hardware and/or logic that manages communication between controller 32 and destination network 20. Network interface controllers 60, 62 also transfer environmental status data (e.g., temperature, etc.) that the corresponding device 18, 22 uses to determine its mode of operation. Controllers 30, 32 each include at least one processing device that executes instructions stored in accessible read-only or rewritable memory to perform the respective functions described herein. Controllers 30, 32 also have the ability to run platform services on data that needs to be transferred as dictated by the user (e.g., anti-virus, information trending data, maintenance metrics, etc.).

Figure 3:
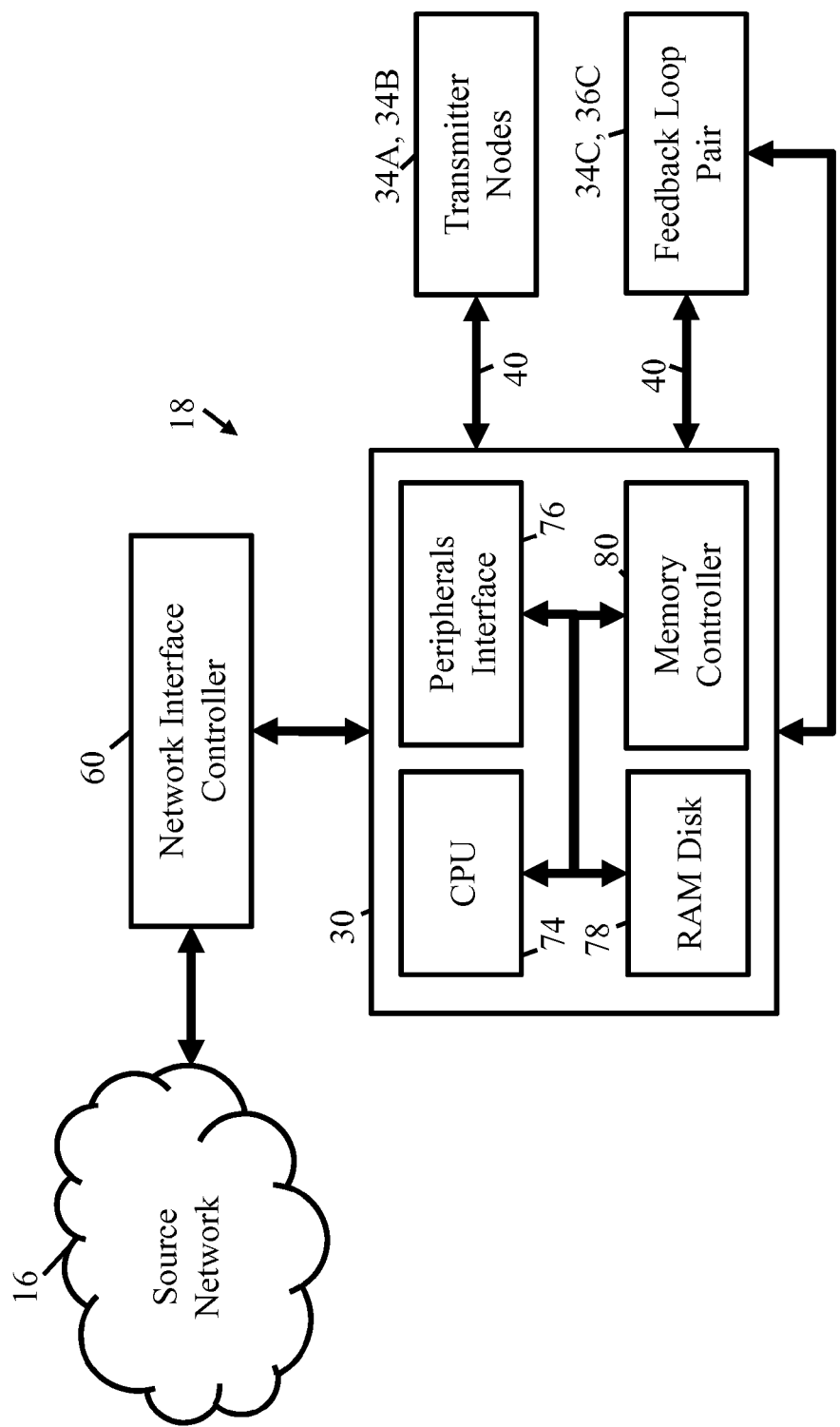
FIG. 3 illustrates an exemplary data transmission controller of the data transmitter device of FIG. 2.

Referring to the illustrated embodiment of FIG. 3, an exemplary data transmission controller 30 includes a central processing unit (CPU) 74, a peripherals interface 76, a memory controller 80, and a random access memory (RAM) disk 78. CPU 74 is operative to execute program instructions stored in RAM disk 78 to perform the functions described herein. RAM disk 78 further stores the databases downloaded from source network 16, although the databases may alternatively be stored in other storage, such as nonvolatile memory. Peripherals interface 76 provides input and output connections to peripheral devices as specified by CPU 74, such as user input/output devices (e.g., keyboard, mouse, touchscreen, monitor, etc.). Memory controller 80 manages the allocation of data on RAM disk 78. Controller 30 may additionally include nonvolatile memory storage, such as a hard disk, read only memory, flash drive, etc.

Figure 4:
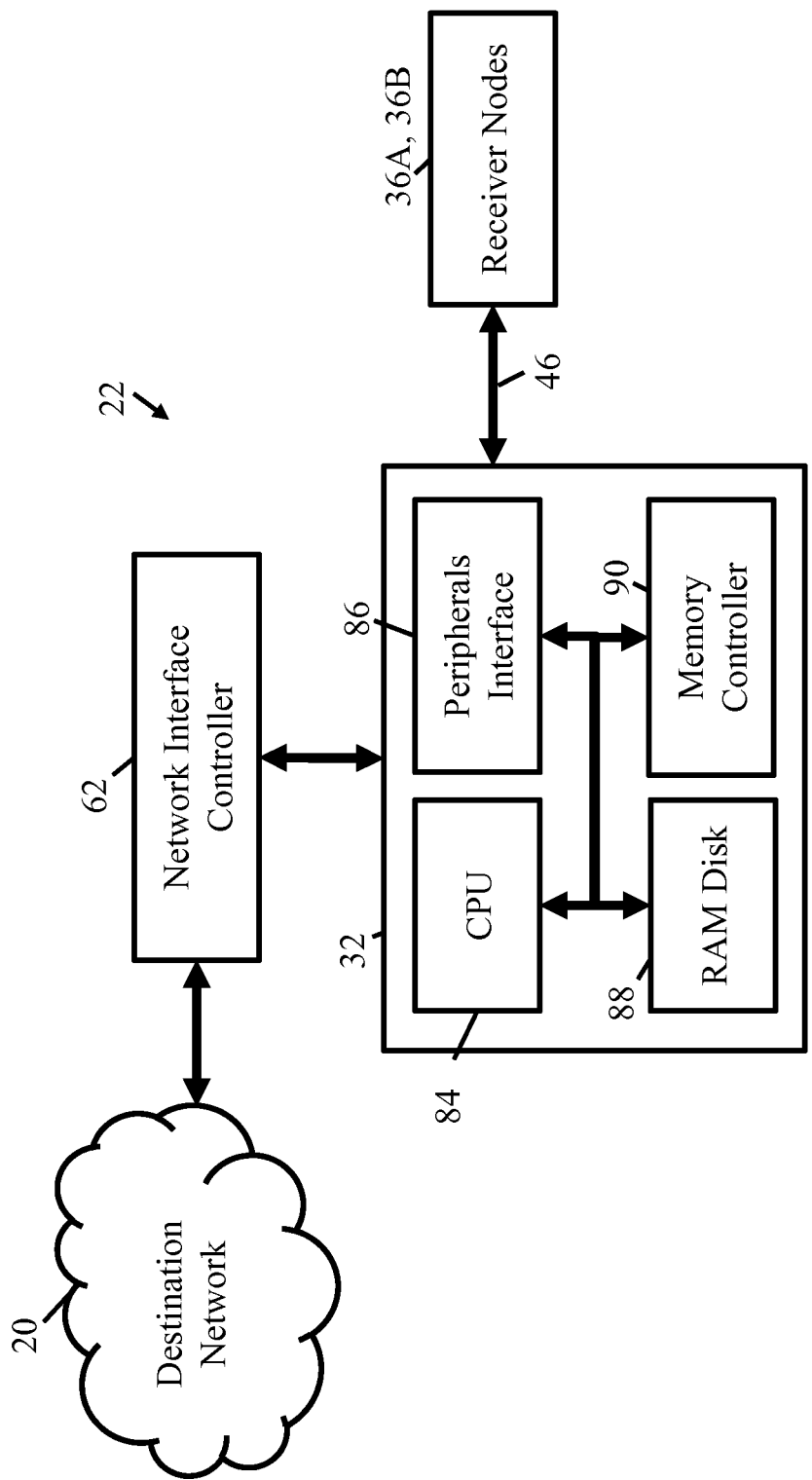
FIG. 4 illustrates an exemplary data receiver controller of the data receiver device of FIG. 2.

Referring to the illustrated embodiment of FIG. 4, an exemplary data receiver controller 32 includes a central processing unit (CPU) 84, a peripherals interface 86, a memory controller 90, and a random access memory (RAM) disk 88. CPU 84 is operative to execute program instructions stored in memory disk 88 to perform the functions described herein. RAM disk 88 further stores the database(s) received from device 18, although the databases may alternatively be stored in other storage, such as nonvolatile memory. Peripherals interface 86 provides input and output connections to peripheral devices as specified by CPU 84, such as user input/output devices (e.g., keyboard, mouse, touchscreen, monitor, etc.). Memory controller 90 manages the allocation of data on RAM disk 88. Controller 32 may additionally include nonvolatile memory storage, such as a hard disk, read only memory, flash drive, etc. In some embodiments, the peripheral devices connected to interfaces 76, 86 include various external modules that facilitate data transmission in accordance with the device architecture.

Referring again to FIG. 2, data transmitter device 18 includes a plurality of transmitter nodes 34, illustratively nodes 34A, 34B, and 34C, in communication with controller 30 via communication links 40. Communication links 40 include wired (or wireless) communication lines routed from controller 30 to transmitter nodes 34. As described herein, each transmitter node 34 receives the same data from controller 30 and transmits the data to a corresponding receiver node 36. Data receiver device 22 of closed network 14 includes a pair of receiver nodes 36A, 36B that receive data from transmitter nodes 34A, 34B via communication paths 26A, 26B, respectively. As such, transmitter nodes 34A, 34B and respective receiver nodes 36A, 36B provide transmit/receive pairs for one-way data communication from open network 12 to closed network 14. Additional transmit/receive pairs may be provided with system 10. Each communication path 26A, 26B transmits the same data, but paths 26A, 26B may transmit that data using the same or different communication formats (e.g., light, sound, or other communication formats). Data transmitter device 18 further includes a receiver node 36C in communication with transmitter node 34C to provide an internal feedback loop pair to controller 30 for data verification purposes. In one embodiment, a communication path 38 between transmitter node 34C and receiver node 36C includes an air gap. Receiver node 36C is coupled to controller 30 via communication link 42 to complete the feedback loop.

In the illustrated embodiment, each transmitter node 34 is dedicated to data transmission, i.e., transmitter nodes 34 cannot receive data and thereby block the reception of data from receiver device 22. Similarly, each receiver node 36 is dedicated to data reception, i.e., receiver nodes 36 cannot transmit data, thereby blocking outgoing communication from receiver device 22 to transmitter device 18. In alternative embodiments, nodes 34, 36 may be configured to both transmit and receive data.

In some embodiments, each transmitter node 34 includes an optical transmitter (see transmitter 102 of FIG. 5), such as photoelectric transmitter, an infrared emitter, a visible light emitter (e.g., light bulb, light emitting diode, laser emitter, computer display monitor, etc.), or other suitable optical transmitter. Similarly, each receiver node 36 includes an optical receiver (see receiver 122 of FIG. 6), such as a photoelectric sensor, infrared receiver, video camera for reading the visual cues of the visible light emitter, or other suitable optical receiver technology. Other suitable data transmission technologies may be used, such as for radio wave, microwave, sound, or electromagnetic radiation transmission.

Data transmission controller 30 acquires data from source network 16 that is to be transmitted to destination network 20 for synchronizing the databases of each network 12, 14. The data may include only data that has been updated or modified at source network 16 and needs to be updated at destination network 20. Alternatively, the data may include an entire database including both the updated and original data of the database of source network 16. In one embodiment, CPU 74 (FIG. 3) of controller 30 accesses one or more databases on source network 16 and synchronizes (updates) the local storage device with the databases on source network 16. In one embodiment, the updated databases are stored in RAM disk 78 (FIG. 3) or in another suitable storage device of controller 30.

Controller 30 provides the updated data to transmitter nodes 34 for one-way transmission to receiver device 22. In the illustrated embodiment, CPU 74 (FIG. 3) of controller 30 converts the data from source network 16 into an encoded format prior to providing the data to transmitter nodes 34. In one embodiment, the encoded format is a text file format. In one embodiment, controller 30 converts multiple databases from source network 16 into multiple text files for transmission to receiver device 22. Alternatively, controller 30 may provide the raw data to each transmitter node 34, and each transmitter node 34 converts the data into the encoded format prior to transmitting to receiver device 22.

Each transmitter node 34A, 34B transmits the data from controller 30 to a corresponding receiver node 36A, 36B of data receiver device 22 via respective communication paths 26A, 26B over air gap 24. Transmitter node 34C of device 18 transmits the data to receiver node 36C of device 18 over communication path 38. As such, the same data is routed to receiver nodes 36A, 36B, 36C over multiple communication paths 26A, 26B, and 38, respectively.

In the illustrated embodiment, each transmitter node 34 transmits the data stream as an optical signal to a respective receiver node 36. In one embodiment, each transmitter node 34 transmits the text files to the corresponding receiver node 36 as a sequence of light pulses or light colors, or other electromagnetic signals depending on system architecture. For example, the characters (numbers, letters, etc.) of the text file may be transmitted as a series of unique colors, infrared signals, or light pulses that each denotes a unique character. Alternatively, the light pulses may be transmitted in Morse code to the data receiver device 22 or in another suitable encoded scheme. Data receiver device 22 on closed network 14 then receives and decodes these visual cues and writes the corresponding data into a text file to complete the data transfer.

At data receiver device 22, receiver nodes 36A, 36B each route the received data stream to data receiver controller 32. In the illustrated embodiment, each receiver node 36A, 36B includes logic to read the optical signals from transmitter nodes 34A, 34B and to generate a text file based on the optical signals. Controller 32 verifies the data transmission by comparing the text files generated by each receiver node 36A, 36B. If the data in each text file is the same, controller 32 determines the data transmission is successful. If the data in each text file differs, controller 32 determines the data transmission is unsuccessful and earmarks the received data as being invalid. Controller 32 provides an indication of the result of the data transmission verification to a user, such as with a visual indication using an LED or a computer monitor. In one embodiment, duplicate data transmission reduces the risk of having faulty data written to destination network 20 due to error with a transmitter node 34 or receiver node 36. Controller 32 is further operative to decode the text file and to provide the decoded data to a database on destination network 20 to complete the data synchronization.

Transmitter device 18 may periodically retrieve updated data from source network 16 and transmit the data to closed network 14 for database synchronization according to a predetermined synchronization schedule. Further, transmitter device 18 may automatically perform data synchronization in response to transmitter device 18 detecting updated data at source network 16. Further, a user may manually initiate the data synchronization between transmitter device 18 and receiver device 22 via an input device.

In the illustrated embodiment, closed network 14 is not connected to open network 12, and thus a feedback loop from closed network 14 to open network 12 does not exist. The data transmission is validated separately both by transmitter device 18 via internal feedback loop 38, 42 and by receiver device 22 via the comparison of the data from multiple receiver nodes 36A, 36B. In one embodiment, eliminating a feedback loop from closed network 14 to open network 12 reduces the likelihood of data hacking or corruption and of data leaking from closed network 14 to open network 12.

Figure 5:
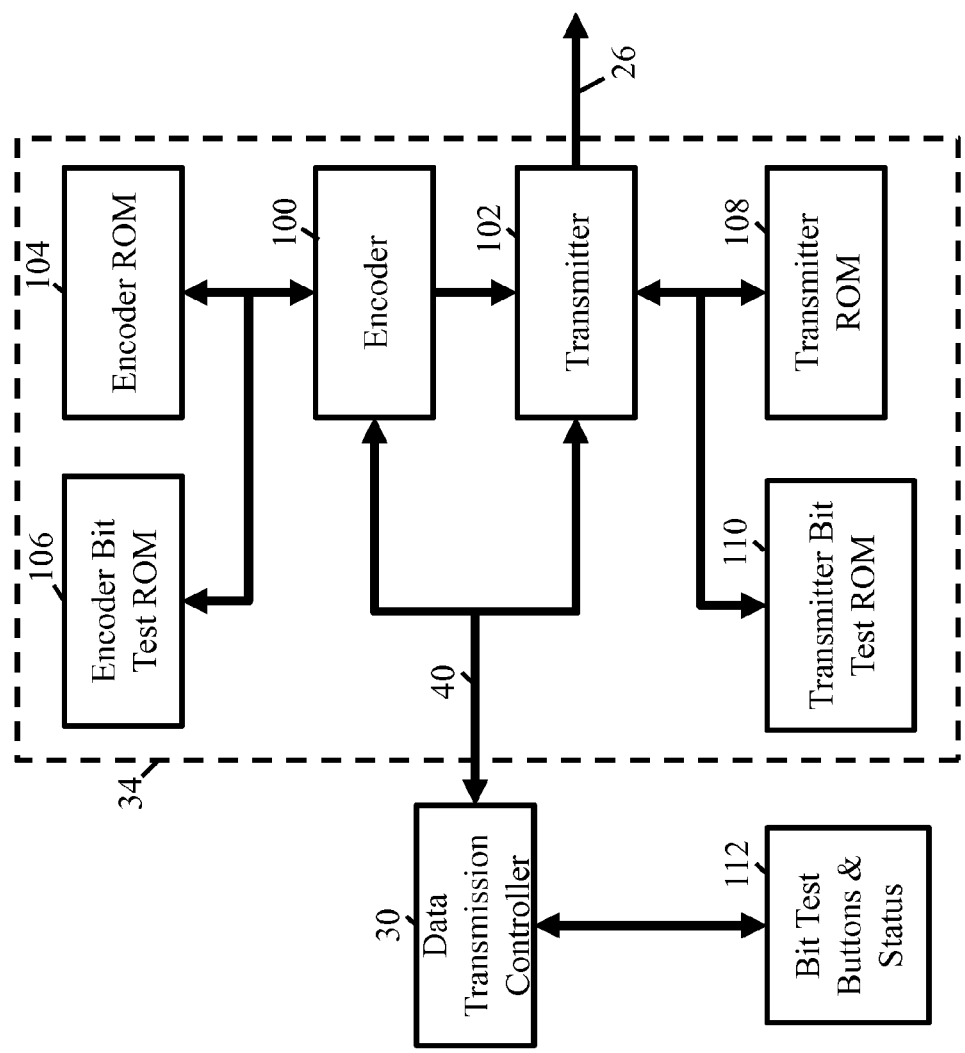
FIG. 5 illustrates an exemplary transmitter node of the data transmitter device of FIG. 2.

Referring to FIG. 5, an exemplary transmitter node 34 of data transmitter device 18 is illustrated. Controller 30 notifies transmitter node 34 of FIG. 5 that it has data for transmission to closed network 14. The data is routed from controller 30 to an encoder 100 and a transmitter 102 of transmitter node 34 over communication links 40. Encoder 100 includes logic that encodes the data according to an encoding scheme or algorithm stored in encoder ROM (read only memory) 104. For example, when the data received from controller 30 is in a text file format, the encoding scheme identifies how each character of the text file is to be transmitted by transmitter 102. Each text character may correspond to a particular light color or pulse pattern, for example. Encoder 100 provides the encoded data stream to transmitter 102.

In the illustrated embodiment, the data provided by controller 30 and the encoded data provided by encoder 100 are digital data. Transmitter node 34 illustratively includes transmitter ROM 108 in communication with transmitter 102 which stores a digital-to-analog (D/A) conversion algorithm. Transmitter 102 includes logic that accesses the D/A conversion algorithm and converts the encoded digital data received from encoder 100 into analog signals (e.g., optical signals) for transmission to receiver device 22 over communication path 26.

Referring still to FIG. 5, transmitter node 34 is further operative to execute a bit test to verify that encoder 100 and transmitter 102 are functioning properly. An encoder bit test ROM 106 stores test data for encoding by encoder 100 during the bit test, and a transmitter bit test ROM 110 stores test data for D/A conversion by transmitter 102 in the bit test. In the bit test mode, encoder 100 encodes the test data according to the encoding algorithm stored in the encoder ROM 104. Similarly, transmitter 102 converts the test data according to the D/A conversion algorithm stored in the transmitter ROM 108. Controller 30 compares the set of encoded data from encoder 100 with expected encoded data stored in encoder bit test ROM 106. If the data differs, the encoder 100 failed to properly encode the test data. Similarly, controller 30 compares the set of converted data from transmitter 102 with expected converted data stored in transmitter bit test ROM 110. If the data differs, transmitter 102 failed to properly convert the test data. A failed bit test may indicate a fault with encoder 100 and/or transmitter 102.

A user device 112 in communication with controller 30 includes buttons or other input devices to allow a user to initiate the bit test mode. User device 112 further provides status indicators (e.g., LEDs, display monitor, etc.) for indicating the status of the bit test (pass or fail). The bit test mode may be used for fault detection to determine which portion of transmitter node 34 is malfunctioning. The bit test may be scheduled or user initiated. In one embodiment, controller 30 initiates the bit test in response to transmitter device 18 failing the data verification provided with feedback loop pair 34C, 36C. Controller 30 includes proper checks, such as checking the user authority level for example, to determine whether the bit test may be executed and whether executing the bit test mode will not interrupt current data transmission in progress. Further, controller 30 is operative to stop current data transmission and force execution of the bit test mode upon request by a user having the proper authority level.

Figure 6:
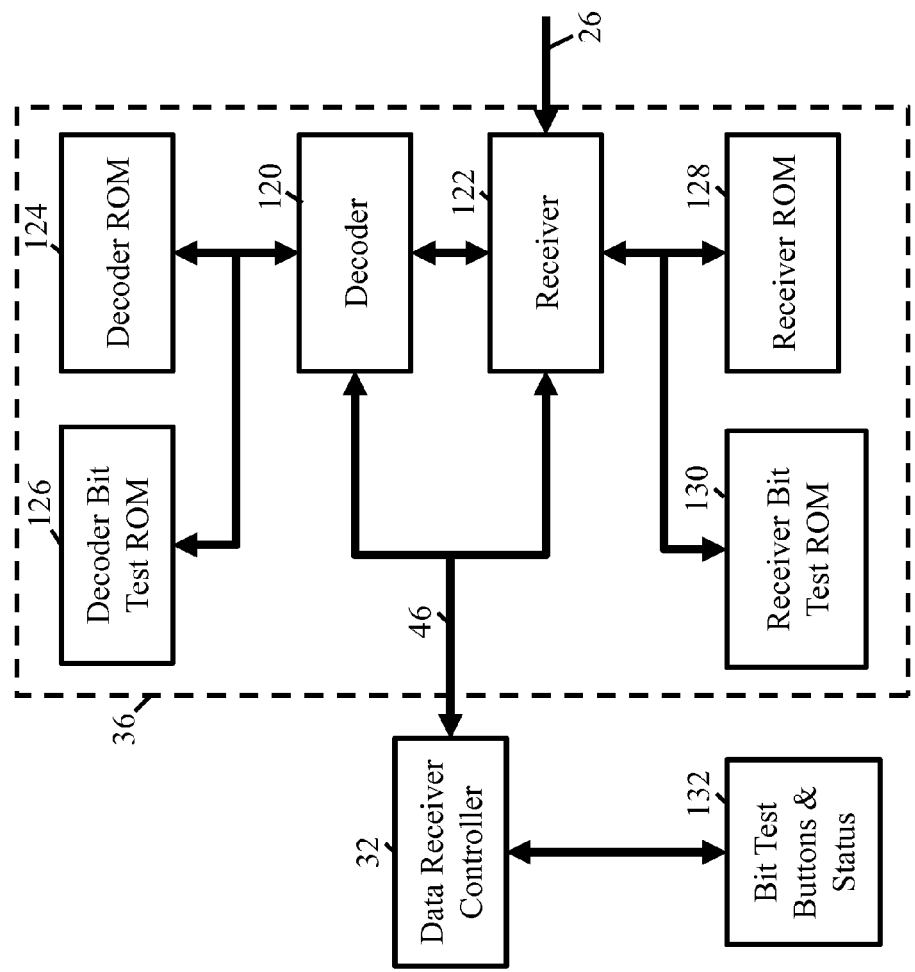
FIG. 6 illustrates an exemplary receiver node of the data receiver device of FIG. 2.

Referring to FIG. 6, an exemplary receiver node 36 of data receiver device 22 of FIG. 2 is illustrated. Data from data transmitter device 18 (FIG. 2) is received by a receiver 122 of receiver node 36. Receiver node 36 illustratively includes receiver ROM 128 in communication with receiver 122 which stores an analog-to-digital (A/D) conversion algorithm. Receiver 122 includes logic that accesses the A/D conversion algorithm to convert the analog signal (e.g., optical signal) received from the transmitter node 34 (FIG. 2) back into a digital signal. Receiver 122 provides the converted digital signal to decoder 120.

Decoder 120 includes logic that decodes the data from receiver 122 according to a decoding scheme or algorithm stored in decoder ROM 124. The decoding algorithm is configured to decode the data into the original format (e.g., text format) of the data provided by controller 30 of data transmitter device 18 (FIG. 2). For example, the decoding algorithm identifies which characters of the text file correspond to which particular light color or pulse pattern. Decoder 120 provides the decoded data to controller 32, and controller 32 performs a data verification before routing the data to destination network 20 (FIG. 2), as described herein.

Receiver node 36 is further operative to execute a bit test to verify that decoder 120 and receiver 122 are functioning properly. A decoder bit test ROM 126 stores test data for decoding by decoder 120 during the bit test, and a receiver bit test ROM 130 stores test data for A/D conversion by receiver 122 during the bit test. In the bit test mode, decoder 120 decodes the test data according to the decoding algorithm stored in the decoder ROM 124. Similarly, receiver 122 converts the test data according to the A/D conversion algorithm stored in the receiver ROM 128. Controller 32 compares the set of decoded data from decoder 120 with expected decoded data stored in decoder bit test ROM 126. If the data differs, decoder 120 failed to properly decode the test data. Similarly, controller 32 compares the set of converted data from receiver 122 with expected converted data stored in receiver bit test ROM 130. If the data differs, receiver 122 failed to properly convert the test data. A failed bit test may indicate a fault with decoder 120 and/or receiver 122.

A user device 132 in communication with controller 32 includes buttons or other input devices to allow a user to initiate the bit test mode. User device 132 further provides status indicators (e.g., LEDs, display monitor, etc.) for indicating the status of the bit test (pass or fail). The bit test mode may be used for fault detection to determine which portion of receiver node 36 is malfunctioning. In one embodiment, controller 32 initiates the bit test mode in response to receiver device 22 failing the data verification provided with the multiple receivers 36A, 36B.

Similarly, receiver node 36C of transmitter device 18 (FIG. 2) also includes the components of receiver node 36 illustrated in FIG. 6. However, receiver node 36C receives the data stream from transmitter node 34C over communication path 38 and routes the decoded and converted data to controller 30 of device 18. Controller 30 is also operative to execute the bit test mode for receiver node 36C.

The bit test mode is illustrated in detail in FIGS. 7-10 according to further embodiments. In one embodiment, the digital logic gates of FIGS. 7-10 are implemented by control logic of controllers 30, 32 (FIG. 2). The inputs and outputs of the digital logic gates are referred to herein as high states (logical value "1") and low states (logical value "0"), as understood by those of ordinary skill in the art. In one embodiment, the multiplexers of FIGS. 7-10 described herein are implemented by control logic of a corresponding transmitter node 34 or receiver node 36.

Figure 7:
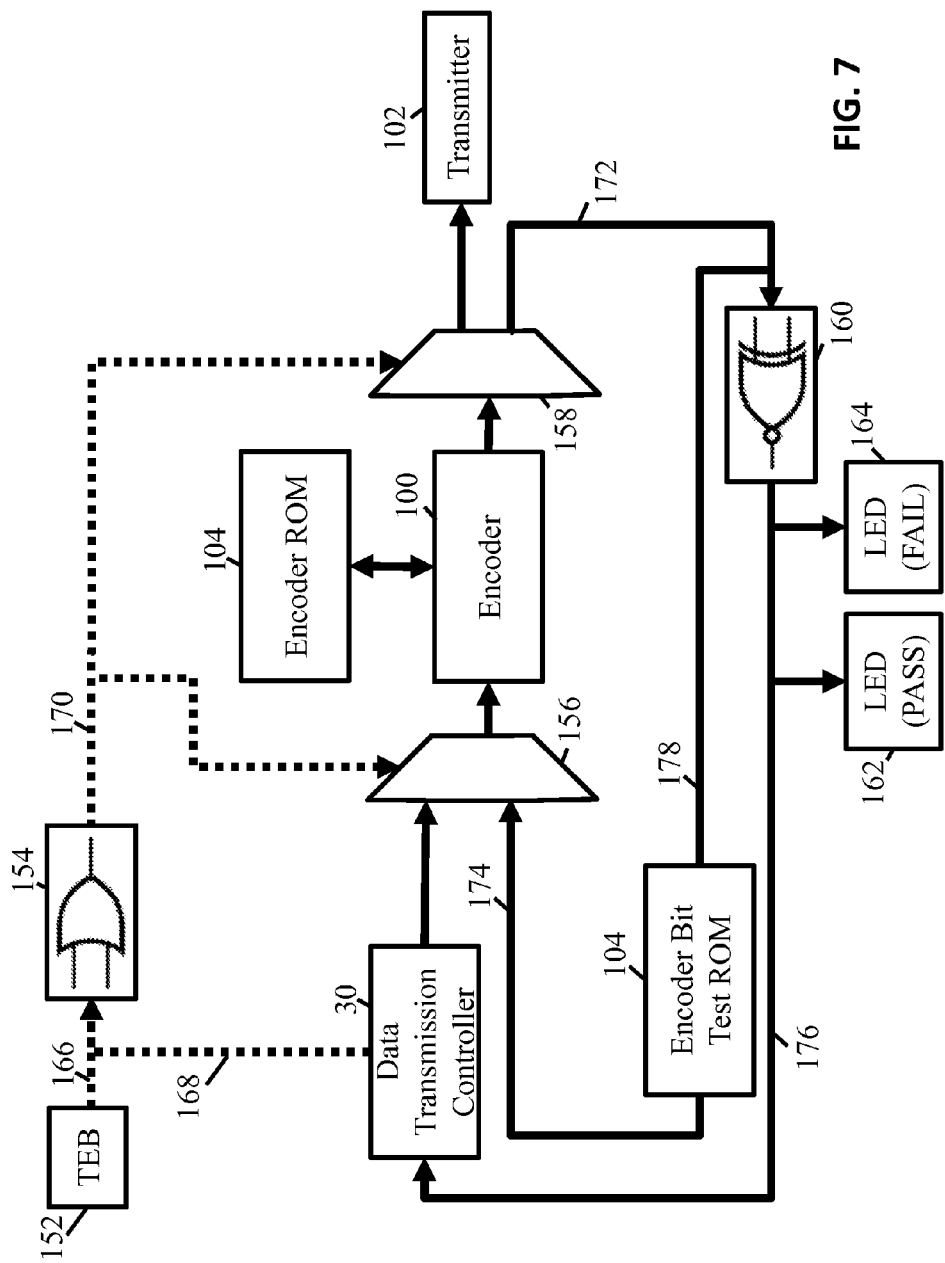
FIG. 7 illustrates an exemplary implementation of a bit test mode of an encoder of the transmitter node of FIG. 5.

Referring to FIG. 7, a bit test mode for encoder 100 of transmitter node 34 (FIG. 2) is illustrated. When the output 170 of logic OR gate 154 is low, a normal mode is executed wherein data transmission operates according to the embodiments described herein. The bit test mode is initiated by actuation of test encoder button 152 of user device 112 (FIG. 5) by a user, causing output 166 to change to a high state, or initiated by control output 168 from controller 30 changing to a high state. If either control output 166 or control output 168 are in a high state, output 170 of logic OR gate 154 changes to a high state, causing multiplexer 156 to allow execution of the bit test. In the bit test, multiplexer 156 switches states to block data from controller 30 and allow test data 174 from encoder bit test ROM 104 to be routed to encoder 100. Encoder 100 encodes the test data 174 according to the encoding algorithm in encoder ROM 104, and outputs the encoded test data to multiplexer 158.

When the bit test is initiated (output 170 of logic gate 154 is high), multiplexer 158 also switches states to block transmission of data to transmitter 102 and to allow transmission of the encoded test data to logic XNOR gate 160. Logic XNOR gate 160 receives as input the encoded test data 172 from encoder 100 and the expected encoder output data 178 from encoder bit test ROM 104. When data 172 and data 178 are the same, the output 176 of XNOR gate 160 is high, causing LED 162 to illuminate to indicate a successful test (pass). When data 172, 178 are different, the output 176 of XNOR gate 160 is low, causing LED 164 to illuminate to indicate a failed bit test. XNOR gate 160 also notifies controller 30 of the test result with output 176.

Figure 8:
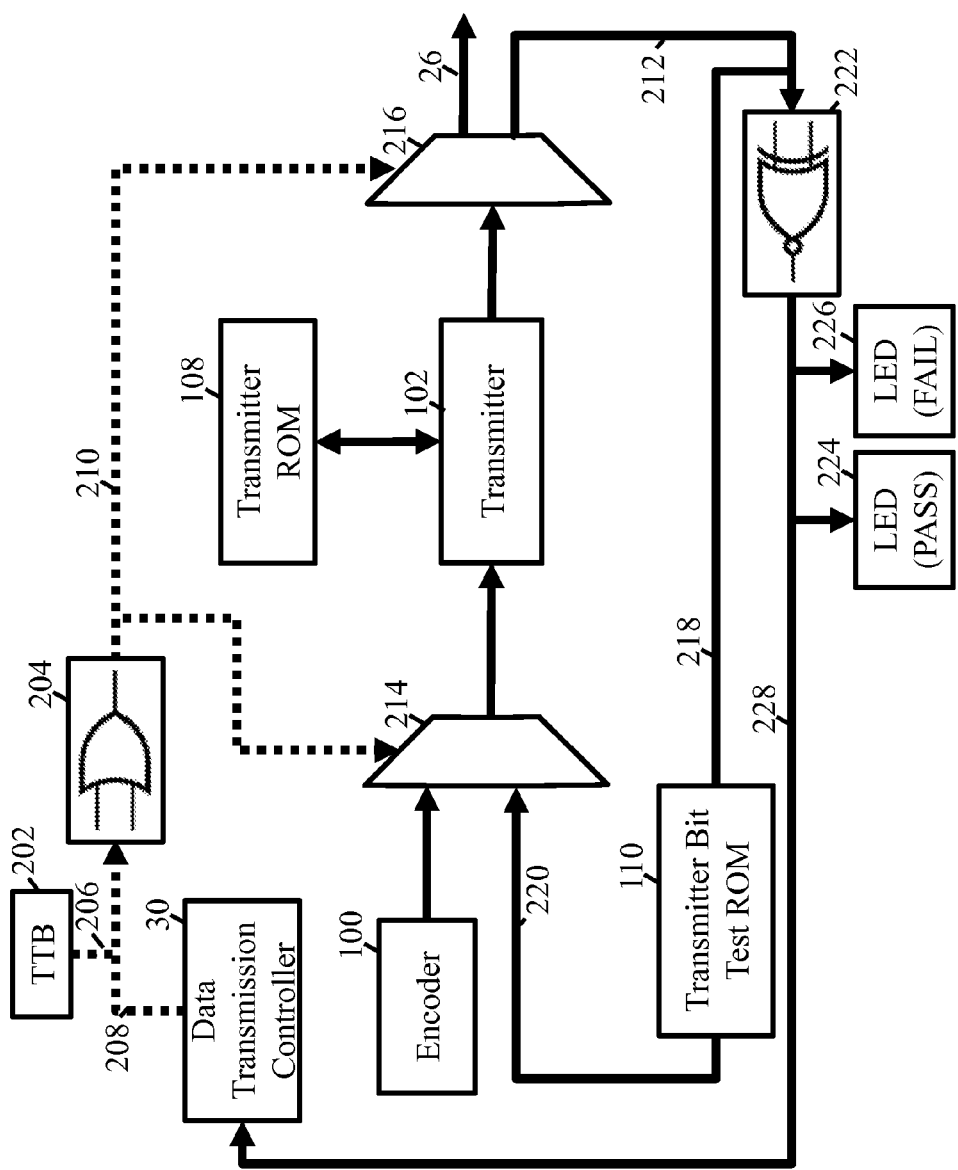
FIG. 8 illustrates an exemplary implementation of a bit test mode of a transmitter of the transmitter node of FIG. 5.

Referring to FIG. 8, a bit test mode for transmitter 102 of transmitter node 34 (FIG. 2) is illustrated. When the output 210 of logic OR gate 204 is low, a normal mode is executed wherein data transmission operates according to the embodiments described herein. The bit test mode is initiated by actuation of test transmitter button 202 of user device 112 (FIG. 5) by a user, causing control output 206 to change to a high state, or initiated by control output 208 from controller 30 changing to a high state. If either control output 206 or control output 208 are in a high state, output 210 of logic OR gate 204 changes to a high state, causing multiplexer 214 to allow execution of the bit test. In the bit test, multiplexer 214 switches states to block encoded data from encoder 100 and to allow encoded test data 220 from transmitter bit test ROM 110 to be routed to transmitter 102. Transmitter 102 converts the encoded test data 220 from digital to analog as described herein according to the D/A conversion algorithm in transmitter ROM 108, and outputs the converted test data to multiplexer 216.

When the bit test is initiated (output 210 of logic gate 204 is high), multiplexer 216 also switches states to block transmission of converted data over communication path 26 and to allow transmission of the converted test data 212 to logic XNOR gate 222. Logic XNOR gate 222 receives as input the converted test data 212 from transmitter 102 and the expected converted output data 218 from transmitter bit test ROM 110. When data 212 and data 218 are the same, the output 228 of XNOR gate 222 is high, causing LED 224 to illuminate to indicate a successful test (pass). When data 212, 218 are different, the output 228 of XNOR gate 222 is low, causing LED 226 to illuminate to indicate a failed bit test. XNOR gate 222 also notifies controller 30 of the test result with output 228.

Figure 9:
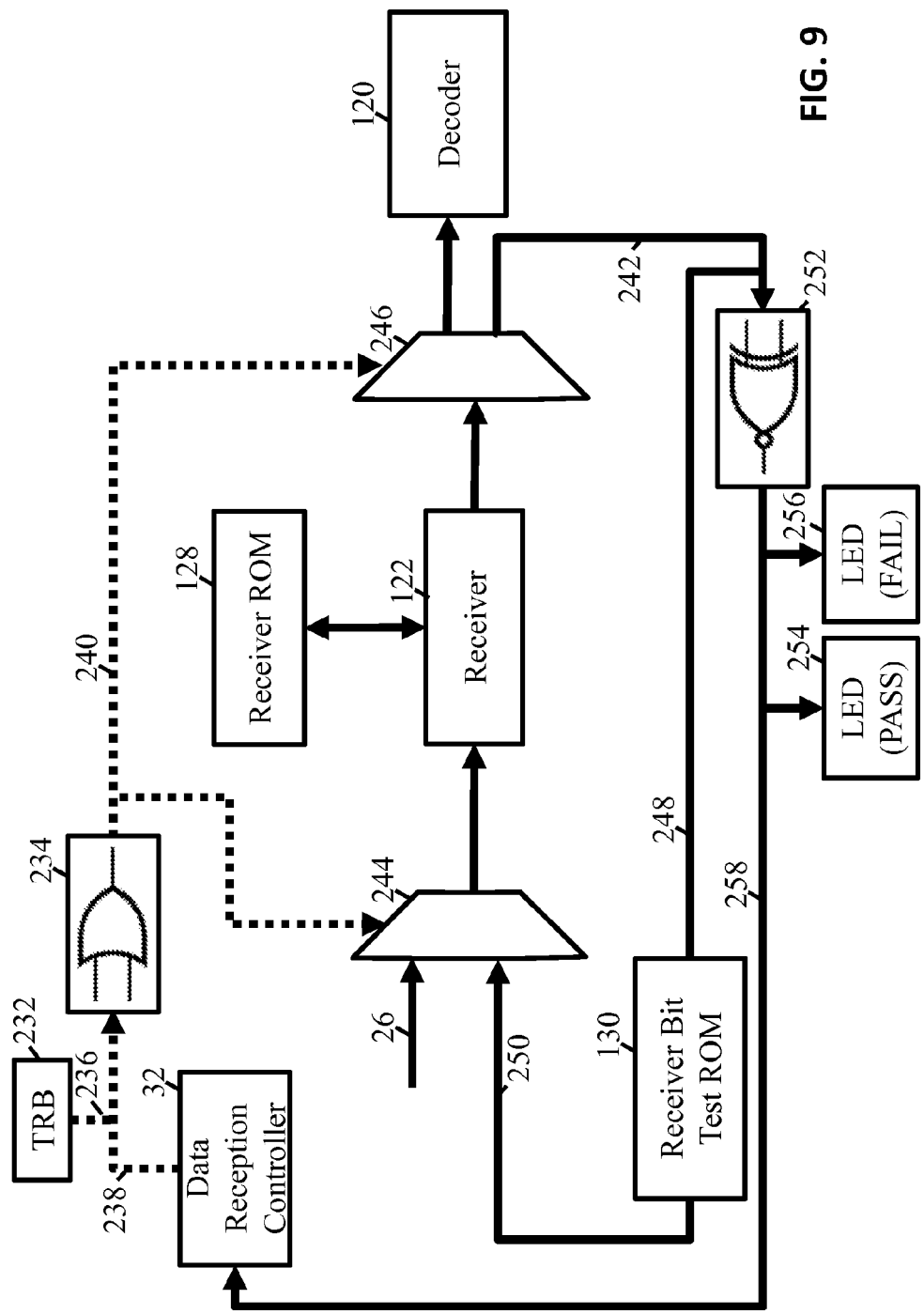
FIG. 9 illustrates an exemplary implementation of a bit test mode of a receiver of the receiver node of FIG. 6.

Referring to FIG. 9, a bit test mode for receiver 122 of receiver node 36 (FIG. 2) is illustrated. When the output 240 of logic OR gate 234 is low, a normal mode is executed wherein data reception operates according to the embodiments described herein. The bit test mode is initiated by actuation of test receiver button 232 of user device 132 (FIG. 6) by a user, causing control output 236 to change to a high state, or initiated by control output 238 from controller 32 changing to a high state. If either control output 236 or control output 238 are in a high state, output 240 of logic OR gate 234 changes to a high state, causing multiplexer 244 to allow execution of the bit test. In the bit test, multiplexer 244 switches states to block data from communication path 26 and to allow analog test data 250 from receiver bit test ROM 130 to be routed to receiver 122. Receiver 122 converts the analog test data 250 to digital data as described herein according to the A/D conversion algorithm in receiver ROM 128, and outputs the converted test data to multiplexer 246.

When the bit test is initiated (output 240 of logic gate 234 is high), multiplexer 246 also switches states to block transmission of data to decoder 120 and to allow transmission of the converted test data 242 to logic XNOR gate 252. Logic XNOR gate 252 receives as input the converted test data 242 from receiver 122 and the expected converted data 248 from receiver bit test ROM 130. When data 242 and data 248 are the same, the output 258 of XNOR gate 252 is high, causing LED 254 to illuminate to indicate a successful test (pass). When data 242, 248 are different, the output 258 of XNOR gate 252 is low, causing LED 256 to illuminate to indicate a failed bit test. XNOR gate 252 also notifies controller 32 of the test result with output 258.

Figure 10:
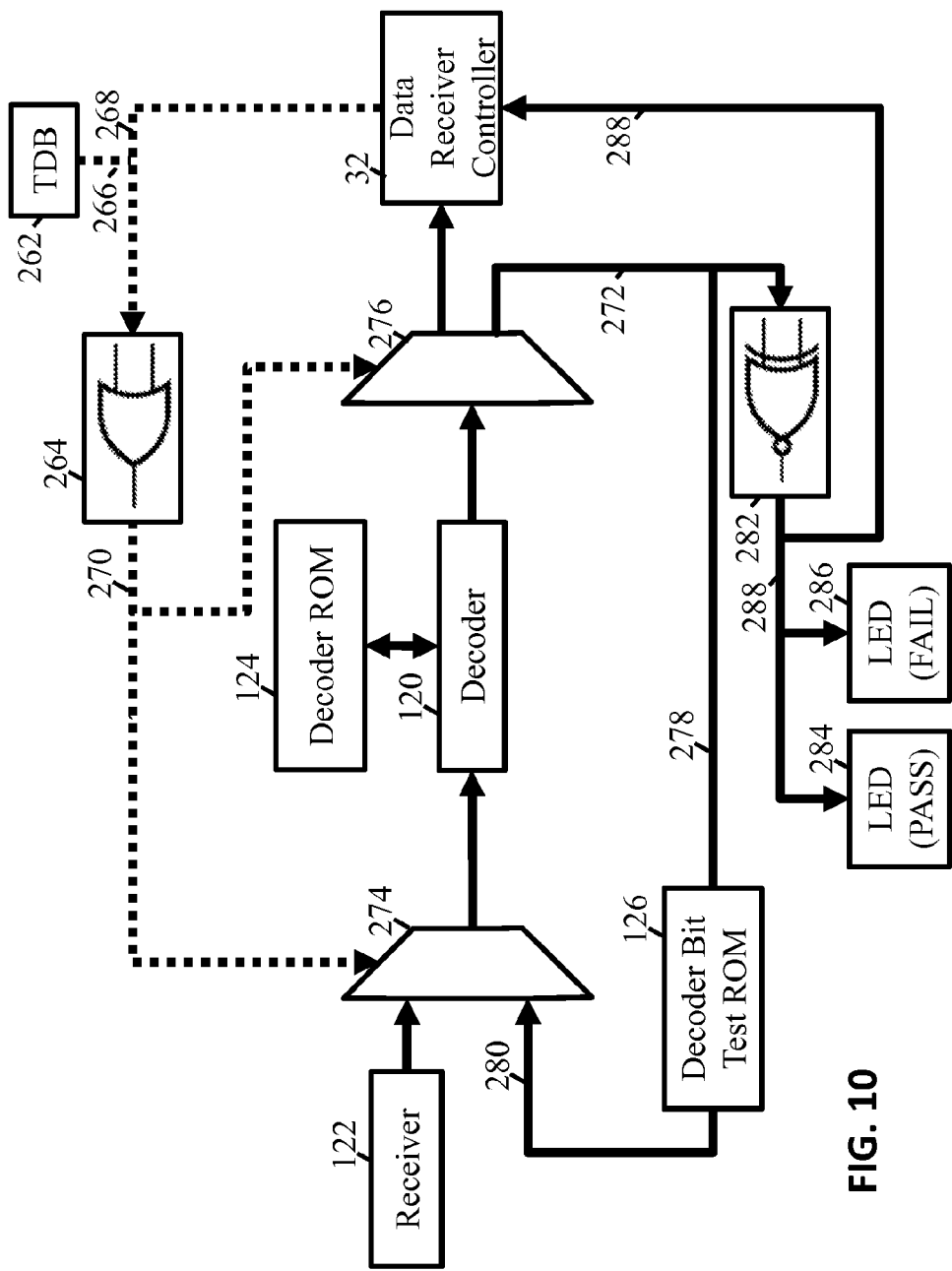
FIG. 10 illustrates an exemplary implementation of a bit test mode of a decoder of the receiver node of FIG. 6.

Referring to FIG. 10, a bit test mode for decoder 120 of receiver node 36 is illustrated. When the output 270 of logic OR gate 264 is low, a normal mode is executed wherein data decoding operates according to the embodiments described herein. The bit test mode is initiated by actuation of test decoder button 262 of user device 132 (FIG. 6) by a user, causing output 266 to change to a high state, or initiated by control output 268 from controller 32 changing to a high state. If either control output 266 or control output 268 are in a high state, output 270 of logic OR gate 264 changes to a high state, causing multiplexer 274 to allow execution of the bit test. In the bit test, multiplexer 274 switches states to block encoded data from receiver 122 and allow test encoded data 280 from decoder bit test ROM 126 to be routed to decoder 120. Decoder 120 decodes the encoded test data 280 according to the decoding algorithm in decoder ROM 124, and outputs the decoded test data to multiplexer 276.

When the bit test is initiated (output 270 of logic gate 264 is high), multiplexer 276 also switches states to block transmission of data to controller 32 and to allow transmission of the decoded test data 272 to logic XNOR gate 282. Logic XNOR gate 282 receives as input the decoded test data 272 from decoder 120 and the expected decoder output data 278 from decoder bit test ROM 126. When data 272 and data 278 are the same, the output 288 of XNOR gate 282 is high, causing LED 284 to illuminate to indicate a successful test (pass). When data 272, 278 are different, the output 288 of XNOR gate 282 is low, causing LED 286 to illuminate to indicate a failed bit test. XNOR gate 282 also notifies controller 32 of the test result with output 288.

Figure 11:
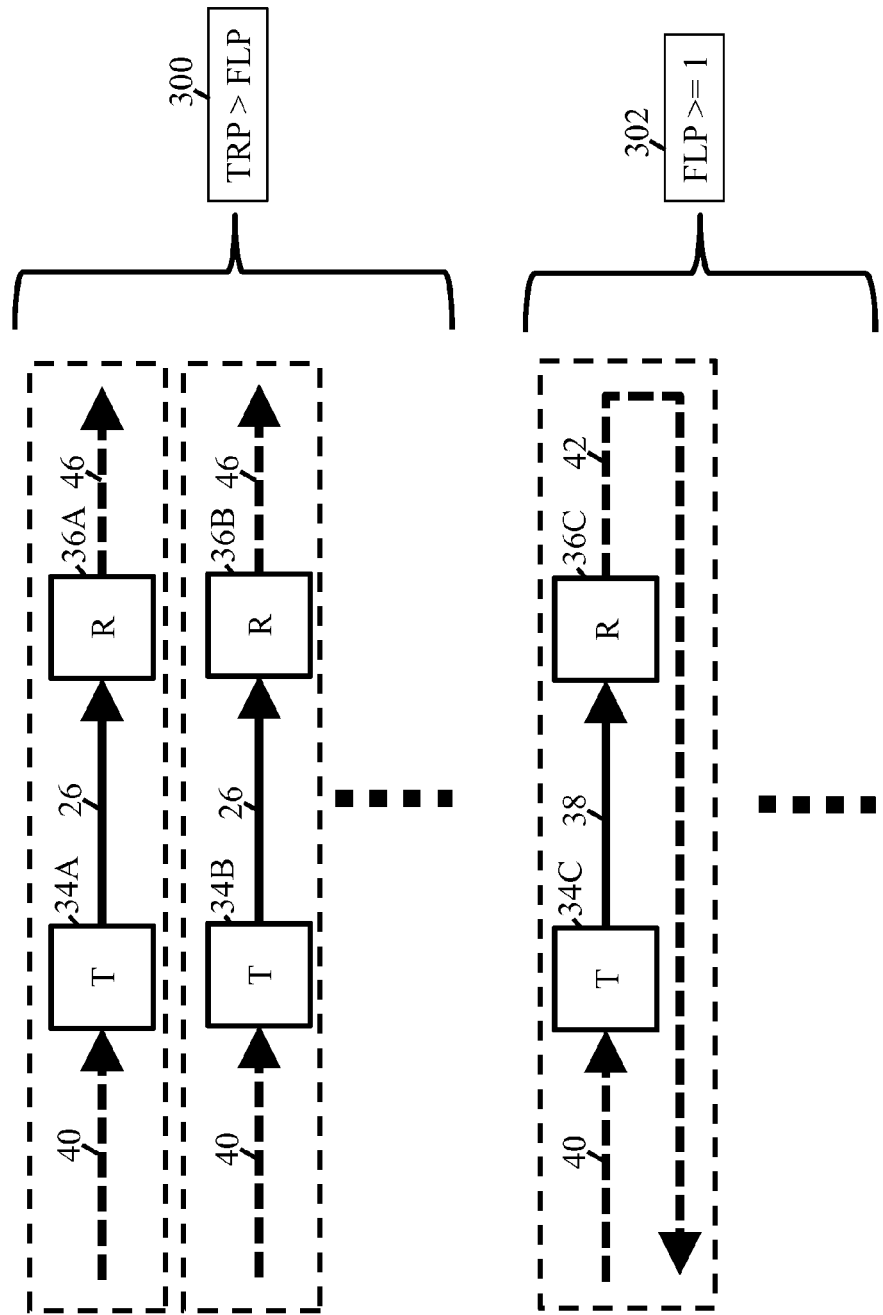
FIG. 11 illustrates exemplary conditions for transmit/receive pairs and feedback loop pairs of the one-way data transmission system of FIGS. 1 and 2.

As described herein, one-way data transmission system 10 of FIGS. 1 and 2 illustratively includes two transmit/receiver pairs comprising transmitter nodes 34A, 34B and respective receiver nodes 36A, 36B. System 10 of FIGS. 1 and 2 illustratively includes a single feedback loop pair at transmitter device 18 comprising transmitter node 34C and receiver node 36C. System 10 may include more than two transmit/receive pairs (TRP) and more than one feedback loop pair (FLP). FIG. 11 illustrates exemplary conditions 300, 302 for system 10 according to some embodiments. As illustrated in FIG. 11, condition 300 indicates that the number of transmit/receive pairs (TRP) in system 10 must exceed the number of feedback loop pairs (FLP) in transmitter device 18. Condition 302 indicates that the number of feedback loop pairs (FLP) must be one or more. As such, in the illustrated embodiment of FIG. 11, with each additional feedback loop pair provided at transmitter device 18 of FIG. 2, an additional transmit/receive pair is provided in system 10. Other suitable conditions may be implemented for adding additional transmit/receiver pairs and/or feedback loop pairs to system 10.

Figure 12:
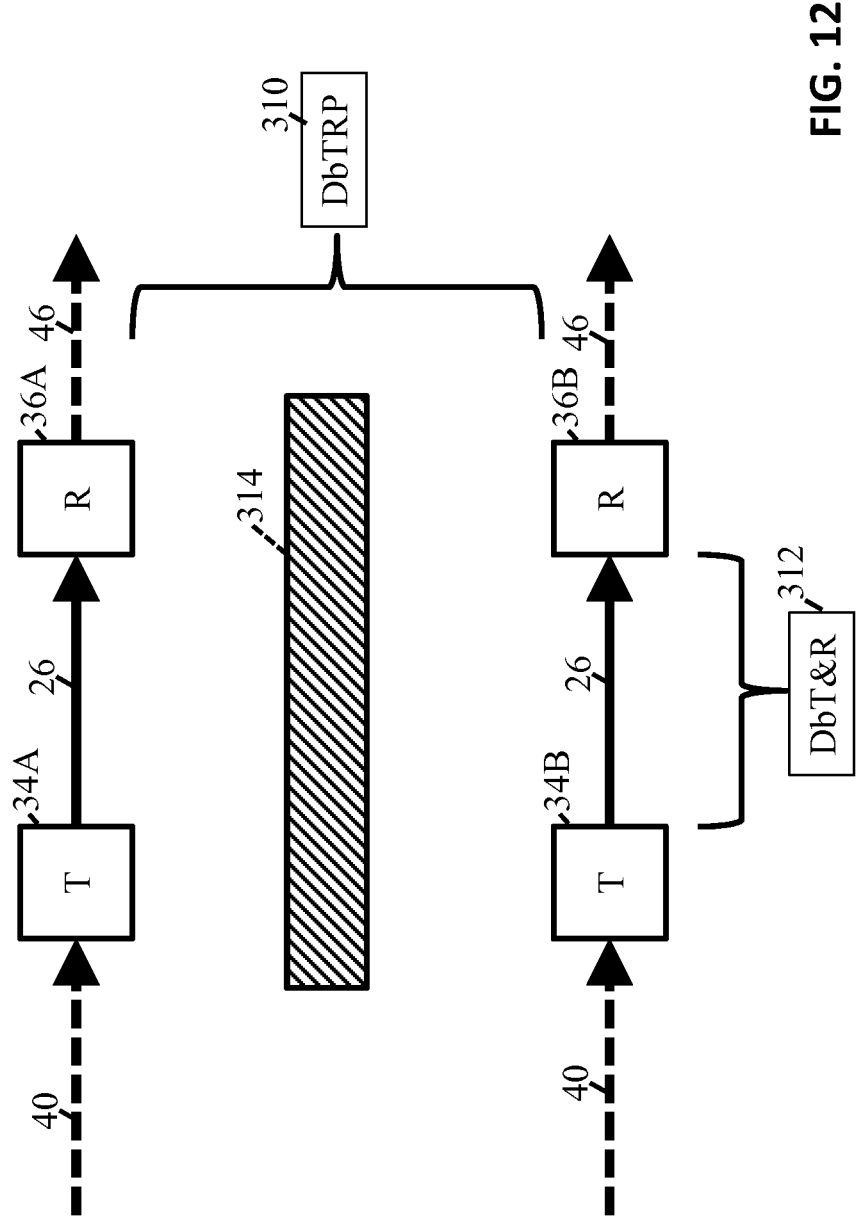
FIG. 12 illustrates a pair of transmit/receive pairs of the one-way data transmission system of FIGS. 1 and 2 including a blocking device positioned between the transmit/receive pairs.

As described herein, the distance between a transmitter node 34 and a receiver node 36, referred to as DbT&R 312 in FIG. 12, may be any suitable distance depending on transmission power capabilities of transmitter nodes 34. In some embodiments, the greater the distance 312 between transmitter node 34 and receiver node 36, the greater the distance must be between transmit/receive pairs (DbTRP 310 of FIG. 12). For example, transmitted optical waves may diffuse over large distances. Increasing the distance 310 between transmit/ receive pairs when a greater distance 312 is between transmitter nodes 34 and receiver nodes 36 reduces the likelihood that the optical signals from transmitter nodes 34 will cross into other communication paths 26. In an alternative embodiment, a blocking device or barrier 314 is provided between transmit/receive pairs along distance 312 to block optical signals from diffusing into other communication paths 26. Blocking device 314 may include a mesh screen or cage, for example, which guides or reflects the optical signal along the corresponding communication path 26 and blocks diffusion into other communication paths. In this embodiment, the distance 312 between transmitter nodes 34 and receiver nodes 36 may be extended without increasing the distance 310 between transmit/receive pairs.

In some embodiments, a repeater is positioned in the communication path between nodes 34 and 36. The repeater receives and transmits the signal to the next node, which is either another repeater or the receiver node 36. In some embodiments, repeaters do not have the capability to encode or decode the signal being repeated.

Figure 13:
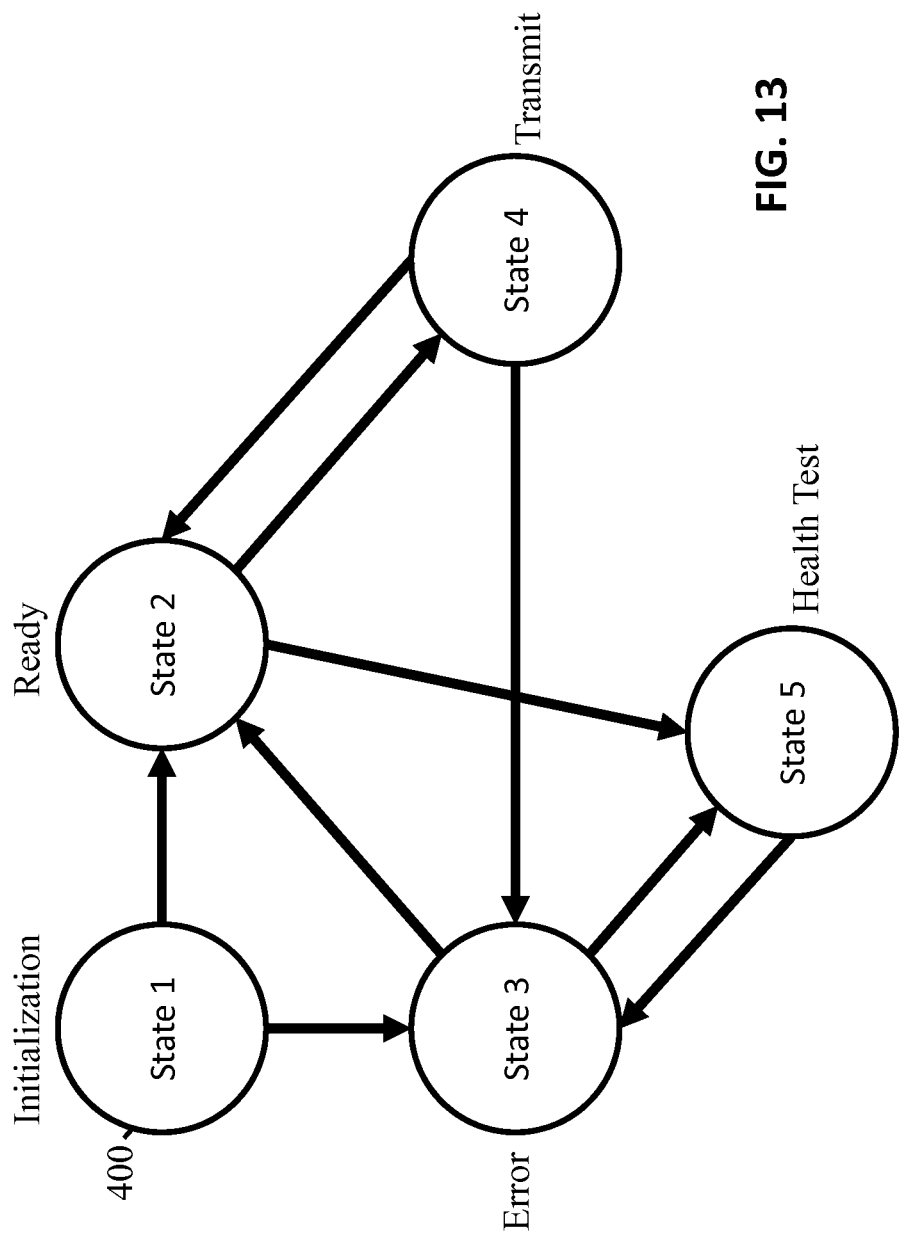
FIG. 13 illustrates an exemplary state diagram of the one-way data transmission system of FIGS. 1 and 2.

Referring to FIG. 13, a state diagram 400 illustrates exemplary operational states of data transmitter device 18 of FIG. 2. When data transmitter device 18 is powered on, device 18 first enters an initialization state 1. In initialization state 1, device 18 executes one or more software/hardware checks and configures itself to a desired configuration, such as a configuration loaded in memory of controller 30 (FIG. 2). From initialization state 1, device 18 enters into either a ready state 2 or an error state 3. Device 18 enters the ready state 2 in response to a successful initialization with no detected errors or failed software/hardware checks. In state 2, device 18 is ready to transmit data. Device 18 waits for instruction from controller 30 or a user to enter either a transmit state 4 or a health test state 5. In response to an instruction to transmit data, device 18 enters the transmit state 4. In the transmit state 4, controller 30 provides data to the transmitter nodes 34, and transmitter nodes 34 encode, convert, and transmit the data to the respective receiver nodes 36, as described herein. Controller 30 also verifies the data transmission in the transmit state 4, as described herein. After completion of the data transmission and verification, device 18 returns to the ready state 2. If an error occurs during the transmit state 4 (e.g., failure to transmit, failed data verification, etc.), then device 18 enters the error state 3.

Device 18 enters error state 3 from initialization state 1 in response to the initialization of device 18 resulting in one or more errors. Exemplary errors in the initialization state 1 that cause the error state 3 include a failed hardware/software check, an undetected network connection, a power failure, or any other suitable initialization error. Once in the error state 3 (from either state 1 or state 4), device 18 enters the health test state 5 to execute a health test that identifies cause of the error. Ready state 2 may also transition into the health test state 5 in response to a user requested health test or a scheduled automatic health test. The health test state 5 reports the results of the health test, such as an error code, to the error state 3. If the health test does not detect an error, the error state 3 reports the health test results to the ready state 2 indicating that device 18 is ready to transmit. If the health test does detect an error, device 18 remains in the error state 3 until the error is corrected and the health test passes without error.

Figure 14:
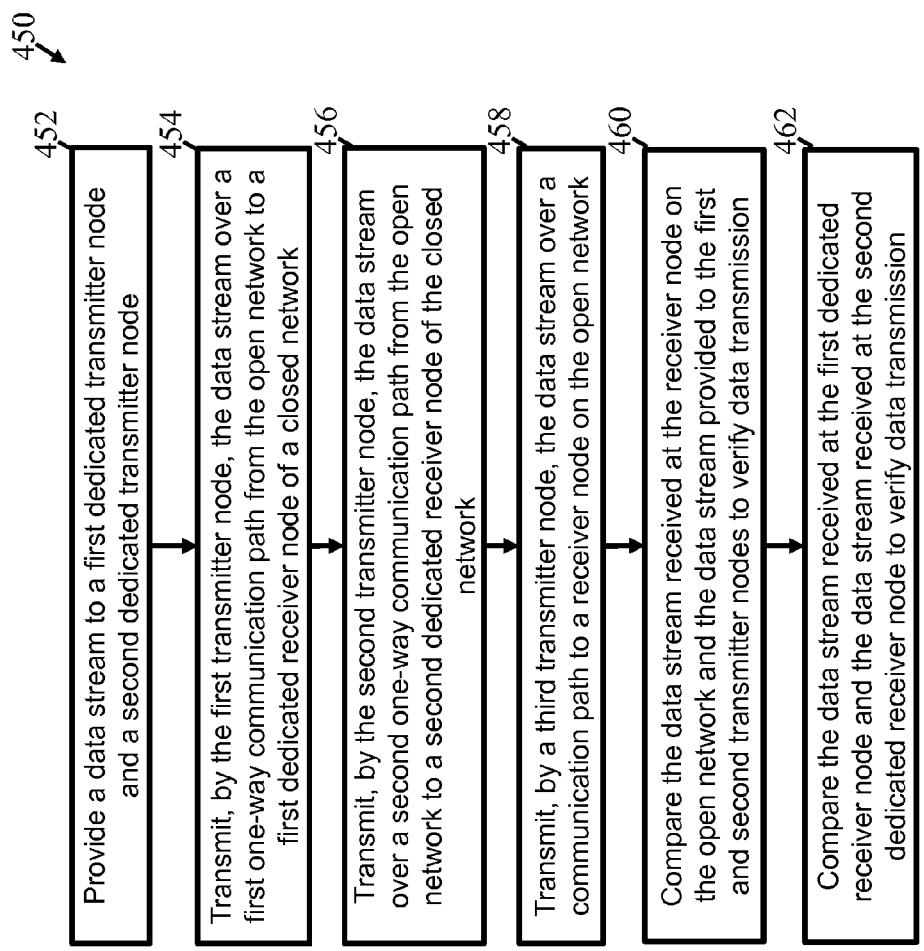
FIG. 14 illustrates a flow diagram of an exemplary method of operation of the one-way data transmission system of FIGS. 1 and 2.

Referring to FIG. 14, a flow diagram 450 of another exemplary method of operation of transmitter device 18 and receiver device 22 of FIGS. 1 and 2 is provided. Reference is made to FIGS. 1 and 2 throughout the description of FIG. 14. At block 452, data transmission controller 30 of open network 12 provides a data stream to a first dedicated transmitter node 34A and a second dedicated transmitter node 34B. The data stream includes updated data from source network 16 of FIG. 1. The data stream may include one or more text files. At block 454, first dedicated transmitter node 34A transmits the data stream from open network 12 over a first one-way communication path 26A to a first dedicated receiver node 36A of closed network 14. At block 456, second dedicated transmitter node 34B transmits the data stream from open network 12 over a second one-way communication path 26B to a second dedicated receiver node 36B of closed network 14. The transmitted data streams in blocks 454 and 456 may include optical signals transmitted over an air gap 24 (FIG. 2).

At block 458, a third transmitter node 34C transmits the data stream provided by controller 30 over communication path 38 to receiver node 36C of transmitter device 18. The data stream may be transmitted as an optical signal over an air gap or other suitable communication path 38. At block 460, controller 30 of transmitter device 18 compares the data stream received at the receiver node 36C on open network 12 with the data stream provided to the first and second transmitter nodes 34A, 34B to verify data transmission, as described herein. Similarly, at block 462 controller 32 of receiver device 22 compares the data stream received at the first dedicated receiver node 36A and the data stream received at the second dedicated receiver node 36B to verify data transmission. In the data transmission verifications performed by controllers 30, 32, the transmission is determined to be successful (pass) if the compared data streams are the same. If the compared data streams are different, the transmission is determined to be unsuccessful (fail).

Exemplary applications of one-way data transmission system 10 of FIG. 1 include applications for data transfer in secure military networks, financial institutions, stocks/securities trading, power plants, vehicle communication, and other suitable applications. For example, in a military application, open network 12 may include a Nonsecure Internet Protocol Router Network (NIPRNet), and closed network 14 may include a Secret Internet Protocol Router Network (SIPRNet). Further, while computer networks are described herein, one-way data transmission system 10 may be implemented with any suitable network, such as telecommunications, earth to space, space to deep space, artificial, electrical, radio, and other suitable networks, for example.

While system 10 is described in the illustrated embodiment with an air gap or free space between data transmitter device 18 and data receiver device 22, a physical communication link may alternatively be used, such as an electrical (e.g., copper) wire, fiber optics, a data bus, or other suitable physical communication link. Further, one-way data transmission system 10 of FIG. 1 may alternatively be configured to transfer data over one-way communication paths from closed network 14 to open network 12.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

While the embodiments have been described as having preferred designs, the disclosed embodiments can be further modified within the spirit and scope of this disclosure. This application is therefore intended to cover any variations, uses, or adaptations of the embodiments using its general principles. Further, this application is intended to cover such departures from the present disclosure as come within known or customary practice in the art to which this disclosure pertains and which fall within the limits of the appended claims.

What is claimed is:

1. A method for one way data transmission from an open network to a closed network, the method including:
   providing, by at least one control device on the open network, a data stream to a first dedicated transmitter node and a second dedicated transmitter node, the first and second dedicated transmitter nodes each being on the open network;
   transmitting, by the first dedicated transmitter node, the data stream over a first one-way communication path from the open network to a first dedicated receiver node of a closed network; and
   transmitting, by the second dedicated transmitter node, the data stream over a second one-way communication path from the open network to a second dedicated receiver node of the closed network.

2. The method of claim 1, further including
   transmitting the data stream over a communication path to a receiver node on the open network; and
   comparing, by the at least one control device on the open network, the data stream received at the receiver node on the open network and the data stream provided to the first and second transmitter nodes to verify data transmission.

3. The method of claim 1, further including
   receiving, by the first dedicated receiver node, the data stream transmitted over the first one-way communication path; and
   receiving, by the second dedicated receiver node, the data stream transmitted over the second one-way communication path.

4. The method of claim 3, further including comparing, by at least one control device on the closed network, the data stream received at the first dedicated receiver node and the data stream received at the second dedicated receiver node to verify data transmission.

5. The method of claim 1, wherein the first one-way communication path passes through an air gap between the first dedicated transmitter node and the first dedicated receiver node, the second one-way communication path passes through an air gap between the second dedicated transmitter node and the second dedicated receiver node, and the data stream transmitted over the first communication path and the data stream transmitted over the second communication path are each provided in an optical signal.

6. The method of claim 1, further including converting, by at least one of the first and second dedicated transmitter nodes, the data stream provided by the at least one control device from an initial format to an encoded optical format, and the data streams transmitted by the first and second dedicated transmitter nodes are in the encoded optical format.

7. A data transmitter device on an open network for one way data transmission from the open network to a closed network, the data transmitter device including:
   a database;
   at least one control device coupled to the open network and to the database, the at least one control device being operative to provide a data stream based on data in the database; and
   a plurality of dedicated transmitter nodes in communication with the at least one control device and each operative to transmit the data stream, the plurality of dedicated transmitter nodes including
     a first dedicated transmitter node operative to transmit the data stream over a first one-way communication path to a first dedicated receiver node of a receiver device on the closed network, and
     a second dedicated transmitter node operative to transmit the data stream over a second one-way communication path to a second dedicated receiver node of the receiver device on the closed network.

8. The device of claim 7, further including a receiver node in communication with the at least one control device and operative to receive the data stream from at least one of the plurality of dedicated transmitter nodes.

9. The device of claim 8, the at least one control device being operative to perform a data transmission verification based on a comparison of the data stream at the receiver node and the data stream provided to the plurality of dedicated transmitter nodes.

10. The device of claim 8, the plurality of dedicated transmitter nodes including a third dedicated transmitter node operative to transmit the data stream to the receiver node.

11. The device of claim 7, wherein the first and second one-way communication paths each include an air gap between the transmitter device and the receiver device.

12. The device of claim 11, wherein the first and second dedicated transmitter nodes each transmit the data stream as an optical signal.

13. The device of claim 7, wherein the at least one control device is operative to convert the data stream provided to the plurality of dedicated transmitter nodes from an initial format into an encoded format.

14. The device of claim 13, wherein the encoded format is a text format.

15. The device of claim 7, wherein the data transmitter device blocks communication from the receiver device on the closed network.

16. A data receiver device on a closed network for one way data transmission from an open network to the closed network, the data receiver device including:
    a database;
    a first receiver node on the closed network operative to receive a first data stream from a first transmitter node on the open network over a first one-way communication path;
    a second receiver node on the closed network operative to receive a second data stream from a second transmitter node on the open network over a second one-way communication path; and
    at least one control device on the closed network operative to perform a data transmission verification based on a comparison of the first data stream received by the first receiver node to the second data stream received by the second receiver node.

17. The device of claim 16, wherein the first and second data streams originate from a same data stream generated at the open network.

18. The device of claim 16, wherein the first and second one-way communication paths each include an air gap between the data receiver device and the first and second transmitter nodes.

19. The device of claim 16, wherein the data streams transmitted by the first and second dedicated transmitter nodes are in an encoded format, and at least one of the first and second receiver nodes is operative to decode the first and second data streams.

20. The device of claim 16, wherein the data receiver device blocks outgoing communication to the first and second transmitter nodes on the open network.

21. A one-way data transmission system including:
    a data transmitter device coupled to an open network including
        at least one control device operative to provide a data stream, and
        a plurality of transmitter nodes including a first transmitter node and a second transmitter node, the first transmitter node operative to transmit the data stream over a first one-way communication path to a closed network and the second transmitter node operative to transmit the data stream over a second one-way communication path to the closed network; and
    a data receiver device coupled to the closed network including
        a first receiver node operative to receive the data stream from the first transmitter node over the first communication path,
        a second receiver node operative to receive the data stream from the second transmitter node over the second communication path, and
        at least one control device operative to perform a data transmission verification based on a comparison of the data stream received by the first receiver node and the data stream received by the second receiver node.

22. The system of claim 21, wherein the data transmitter device further includes a receiver node in communication with the at least one control device and operative to receive the data stream from at least one of the plurality of transmitter nodes.

23. The system of claim 22, the at least one control device of the data transmitter device being operative to perform a data transmission verification based on a comparison of the data stream at the receiver node and the data stream provided to the plurality of transmitter nodes.

24. The system of claim 22, the plurality of dedicated transmitter nodes including a third transmitter node operative to transmit the data stream to the receiver node.

25. The system of claim 21, wherein the data transmitter device and the data receiver device are separated by an air gap, and the first and second one-way communication paths pass through the air gap.

26. The system of claim 21, wherein the data stream over the first one-way communication path and the data stream over the second one-way communication path are each provided in an optical signal transmitted over free space.

27. The system of claim 21, the at least one control device of the data transmitter device being operative to convert the data stream provided to the plurality of transmitter nodes from an initial format into a text format, and the plurality of transmitter nodes are operative to convert the data streams in the text format into an optical format for transmission over the first and second one-way communication paths.

* * * * *